(12) United States Patent
Sturman, Jr.

(10) Patent No.: US 7,045,010 B2
(45) Date of Patent: May 16, 2006

(54) APPLICATOR FOR HIGH-SPEED GEL BUFFERING OF FLEXTUBE OPTICAL FIBER BUNDLES

(75) Inventor: Philip C. Sturman, Jr., Hickory, NC (US)

(73) Assignee: Alcatel, Paris (FR)

( * ) Notice: Subject to any disclaimer, the term of this patent is extended or adjusted under 35 U.S.C. 154(b) by 164 days.

(21) Appl. No.: 09/946,466

(22) Filed: Sep. 6, 2001

(65) Prior Publication Data

US 2003/0044135 A1   Mar. 6, 2003

(51) Int. Cl.
*B05C 11/02* (2006.01)

(52) U.S. Cl. ........................... 118/125; 118/420

(58) Field of Classification Search .............. 65/529, 65/447–451; 264/1.24, 4.28; 427/163.2; 118/125, DIG. 18, 420, 410, 419; 425/113, 425/114
See application file for complete search history.

(56) References Cited

U.S. PATENT DOCUMENTS

| | | | |
|---|---|---|---|
| 3,694,131 A * | 9/1972 | Stuart | |
| 4,098,926 A | 7/1978 | Nothe | |
| 4,349,587 A * | 9/1982 | Aloisio et al. | |
| 4,409,263 A * | 10/1983 | Aloisio et al. | |
| 4,410,567 A | 10/1983 | France et al. | |
| 4,522,148 A * | 6/1985 | Kassahun et al. | |
| 4,531,959 A * | 7/1985 | Kar et al. | 65/382 |
| 4,539,226 A | 9/1985 | Paek et al. | |
| 4,613,521 A | 9/1986 | Smith, Jr. | |
| 4,713,103 A * | 12/1987 | Pennanen et al. | |
| 4,786,137 A | 11/1988 | Cornelison et al. | |
| 4,853,258 A | 8/1989 | Gombert et al. | |
| 5,127,361 A * | 7/1992 | Matsuda et al. | |
| 5,395,557 A | 3/1995 | Griser et al. | |
| 5,911,023 A | 6/1999 | Risch et al. | |
| 5,976,611 A | 11/1999 | Okuna et al. | |
| 6,030,664 A * | 2/2000 | DiMarcello et al. | 427/402 |

FOREIGN PATENT DOCUMENTS

| | | |
|---|---|---|
| DE | 3919067 A1 | 12/1990 |
| EP | 1 043 283 A1 | 10/1998 |
| WO | 00/05608 * | 2/2000 |

* cited by examiner

*Primary Examiner*—Brenda A. Lamb
(74) *Attorney, Agent, or Firm*—Sughrue Mion, PLLC

(57) ABSTRACT

The present invention includes an apparatus for combining a water barrier fluid to a bundle of optical fibers including an entrance die having an orifice which is dimensioned to allow for a bundle of optical fibers to be drawn therethrough. Also, an exit die having an orifice is provided. The entrance die and the exit die, respectively, have inner sides which define a cavity. The cavity is in fluid communication with the orifice of the entrance die and the orifice of the exit die, such that a gap is formed at a meeting point between the cavity and the respective orifices of the entrance and the exit die. The gap is radially surrounded by an extension of the cavity to define a critical flow region. A plurality of baffles are formed in the exit die which are operative to inject fluid into the cavity. Also provided is a main body which supports the entrance die and the exit die. The main body includes a passageway that is in fluid communication with the plurality of baffles. A retaining ring is included which secures the entrance die and the exit die to the main body.

23 Claims, 4 Drawing Sheets

APPLICATOR FOR HIGH-SPEED GEL BUFFERING OF FLEXTUBE OPTICAL FIBER BUNDLES

BACKGROUND OF THE INVENTION

1. Field of the Invention

The present invention generally relates to the field of fiber optic cables, in particular the present invention is directed to a method and apparatus for applying water barrier gels to optical fibers or fiber bundles at high speeds.

2. Discussion of Related Art

Optical fibers are very small diameter glass strands which are capable of transmitting an optical signal over great distances, at high speeds, and with extremely low signal loss as compared to standard wire or cable networks. Optical fiber has found increasingly widespread application and currently constitutes the backbone of the worldwide telecommunication network. Because of this development, there has been a growing need for better quality optical fibers with a decrease in production time and costs, while ensuring adequate material strength for continued operation in increasingly harsh conditions. An important aspect for making better optical fibers is the reduction of structural faults or impurities in the protective coatings applied to the optical fiber during manufacture.

In general, optical fibers are manufactured from relatively large diameter glass preforms. Fiber optic preforms are generally made with three concentric glass layers. The inner layer, or core, is made of a very high quality, high purity $SiO_2$ glass, which for example, may be about 5 mm in diameter. This high purity core is the portion of the optical fiber in which the optical data is transmitted. Concentrically positioned around the high purity core is a second layer of glass, or cladding, with a lower index of refraction then the inner core, and generally is less pure. The difference in refraction indices between the core and cladding allows the optical signals in the core to be continuously reflected back into the core as they travel along the fiber. The combination of the core and cladding layers is often referred to as the "primary preform." The optical fiber is then formed by heating and softening a portion of the preform, and rapidly drawing the softened portion with specialized equipment. The length of the drawn optical fiber is typically several thousands of times the length of the primary preform. Optical fibers intended for manufacture of telecommunications cables are typically coated with one or more polymer layers. The polymers provide mechanical protection of the fiber surface, and are colored for identification purposes. The coated optical fibers, singly or in groups, are typically covered with one or more of a number of jackets that provide structural support and environmental protections. The aggregate of the optical fiber, jackets, and additional integrated mechanical supports, is typically referred to as an optical fiber cable.

Exposure to water or humid air causes chemical changes in the surface of the optical fiber, resulting in a degradation of its ability to carry information. The most common method used to prevent or mitigate this degradation, is to reduce or eliminate water contact on the fiber surface by substantially filling the protective housings with a water barrier compound such as a hydrophobic fluid. For a number of reasons, including cable behavior during installation and long-term stability of the cables during use, the hydrophobic fluid is typically a gel. Gels tend to flow when mechanically stressed, but tend to remain static when under a low mechanical load.

Known methods for applying gel to fibers include drawing the fibers through a reservoir filled with gel so that the fibers are coated. However, the use of such a method often results in an inconsistent coating on the fibers due to air entrapped air. Accordingly, gel applicators have been developed, such as the device disclosed in Griser et al. U.S. Pat. No. 5,395,557, which attempts to reduce air entrapment by using a reservoir filled with pressurized gel. This device includes a housing having a cavity through which a plurality of separated optical fibers are fed. Gel is provided to the cavity from a gel reservoir via a pump. The optical fibers are then drawn through the gel so that the fibers are coated with the gel. The gel is provided under pressure in an attempt to reduce air gaps that may form upon the fibers. However, this technique has numerous draw backs. For example, a relatively large driving pressure is placed upon the gel in the reservoir to reduce air entrainment. Rapid application of barrier gel with this method requires relatively long and narrow application regions to prevent uncontrolled ejection of fluid from application regions, due to the large pressures.

Consequently, an apparatus for applying gel to a plurality of optical fibers, which substantially overcomes the above-recited drawbacks is highly desirable and needed in the optical fiber industry.

SUMMARY OF THE INVENTION

The present invention is directed to eliminating the above problems associated with the application of water barrier fluids, such as a gel, to optical fibers and optical fiber bundles. Thus, the invention improves the quality of the optical fiber cable and manufacturing process used to apply the gel.

The present invention addresses the above problems by providing a gel application apparatus that applies the gel with a flow having a high velocity in a direction normal to the surface of the optical fibers, as the fibers pass between an entrance die and an exit die. This creates a linear velocity great enough to overcome the kinetic energy of an air boundary layer traveling along with the fibers through the die entrance. Thus, the method and apparatus is capable of accurately and efficiently coating optical fibers while eliminating unwanted air pockets.

More specifically, the present invention relates to an apparatus for applying a coating of a water barrier fluid, such as a gel to an optical fiber including a die having an entrance side and exit side. An orifice is formed in the die which extends through the entrance side and exit side in a widthwise direction, and which is dimensioned to allow for an optical fiber to be drawn therethough. A cavity is formed in the die, and is in fluid communication with the orifice. A fluid insertion opening is formed in the die for injecting fluid into the cavity. When a fluid is injected into the cavity it travels through the cavity and out of a circumferential exit gap, such that it coats a portion of the optical fiber. The circumferential gap is formed at a meeting point between an inner portion of the cavity and the respective orifices of the entrance and the exit die.

The present invention still further provides for an apparatus for applying a coating to several optical fibers or a bundle of optical fibers, including an entrance die having an orifice which is dimensioned to allow for a bundle of optical fibers to be drawn therethrough. Also, an exit die having an orifice is provided. The entrance die and the exit die, respectively, have inner sides, which define a cavity. The cavity is in fluid communication with the orifice of the entrance die and the orifice of the exit die, such that a circumferential gap is formed at a meeting point between the cavity and the respective orifices of the entrance die and the exit die. Thus, the circumferential gap is radially surrounded by an extension of the cavity, to define a critical flow region. A plurality of baffles are formed in the exit die, which are operative to inject fluid into the cavity. Also provided is a main body, which supports the entrance die and the exit die. The main body includes a passageway which is in fluid communication with the plurality of baffles. A retaining ring is also included, which secures the entrance die and the exit die to the main body.

Additionally, when fluid is passed through the circumferential gap toward the plurality of fibers it travels at a velocity which is sufficient to overcome kinetic energy of an air boundary layer traveling along with the optical fibers drawn through the entrance die, prior to the fibers being drawn through the exit die.

Still further the invention provides for a method of applying a water barrier fluid, such as a gel to one or more optical fibers, including the steps of drawing an optical fiber through an orifice formed in a die; and injecting a fluid into a cavity formed in the die, wherein the cavity is in fluid communication with the orifice, and wherein the fluid is pressurized out of the orifice and onto the optical fiber.

BRIEF DESCRIPTION OF THE DRAWINGS

The advantages, nature and various additional features of the invention will appear more fully upon consideration of illustrative embodiments of the invention which are schematically set forth in the drawings, in which.

DETAILED DESCRIPTION OF THE PREFERRED EMBODIMENTS

The present invention will be explained in further detail by making reference to the accompanying drawings, which do not limit the scope of the invention in any way.

Figure 1:
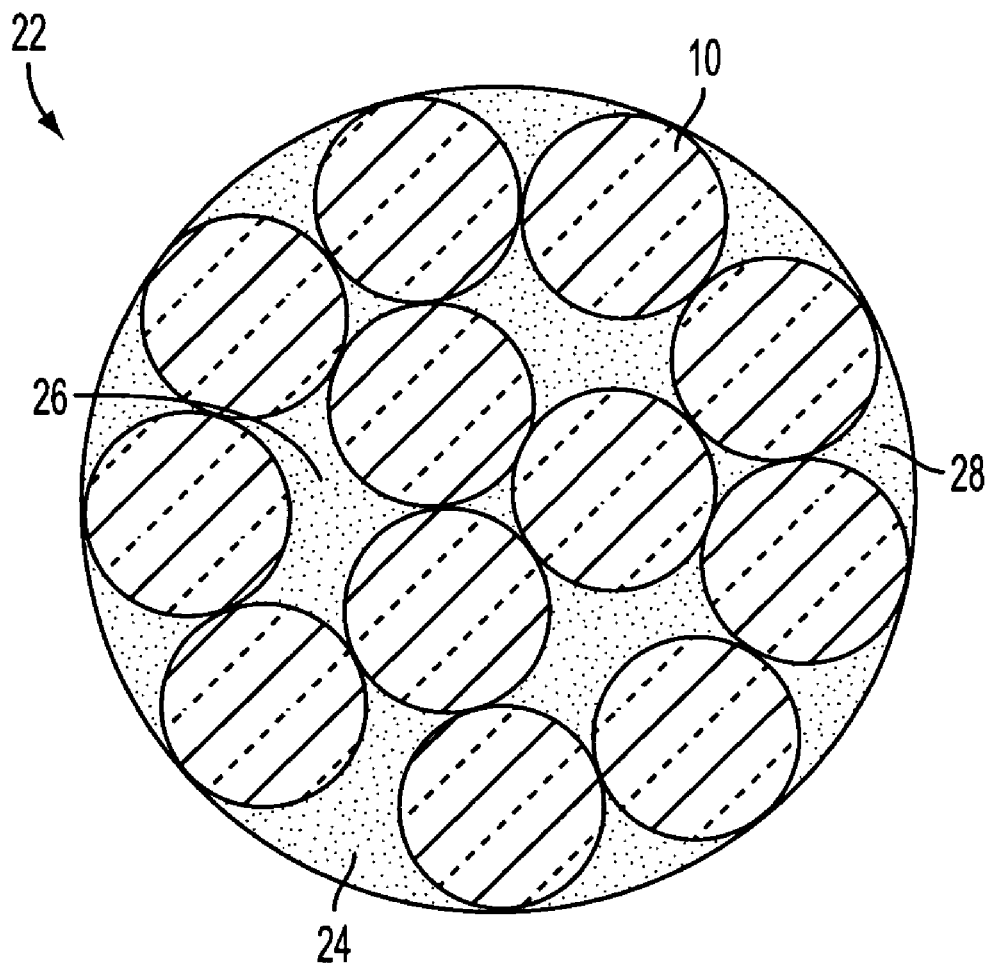
FIG. 1 is front view of an exemplary arrangement of fibers having a gel provided thereon, according to the present invention.

With reference to FIG. 1, a plurality of optical fibers 10 are shown in a radial arrangement forming a fiber bundle 22. In this embodiment, twelve optical fibers 10 are shown; however, it will be appreciated that the optical fiber bundle 22 may consist of a varying arrangement and number of optical fibers 10. The fiber bundle 22 is shown as having an outer portion 24 and an inner portion 26.

According to the present invention, a water barrier fluid 28, for example, a thixotropic gel, is disposed onto the outer 24 and inner 26 portions of the fiber bundle 22, as described below. The gel 28 acts to prevent ingress of water to the optical fiber surface produced from direct liquid contact or exposure to humid air. Although, thixotropic gel is described, any of a broad classification of fluid polymeric materials may be used, provided that the materials meet the criteria of chemical compatibility with the optical fibers and their coatings, and that the water barrier fluid possess a chemical nature that materially limits the transport of water to the optical fiber surface. For example, other suitable materials may include Newtonian liquids, dilute solutions containing polymer molecules, and liquid slurries containing solid particles, although not limited to such materials. In addition, it is typically desired that the fluid does not leak from open ends of cable housings. This undesirable behavior would result in an eventual exposure of a length of each fiber being exposed to the cable environment. The intrinsic mechanical behavior of gels makes this class of materials most appropriate for use as a water barrier in optical fiber cables.

Figure 2:
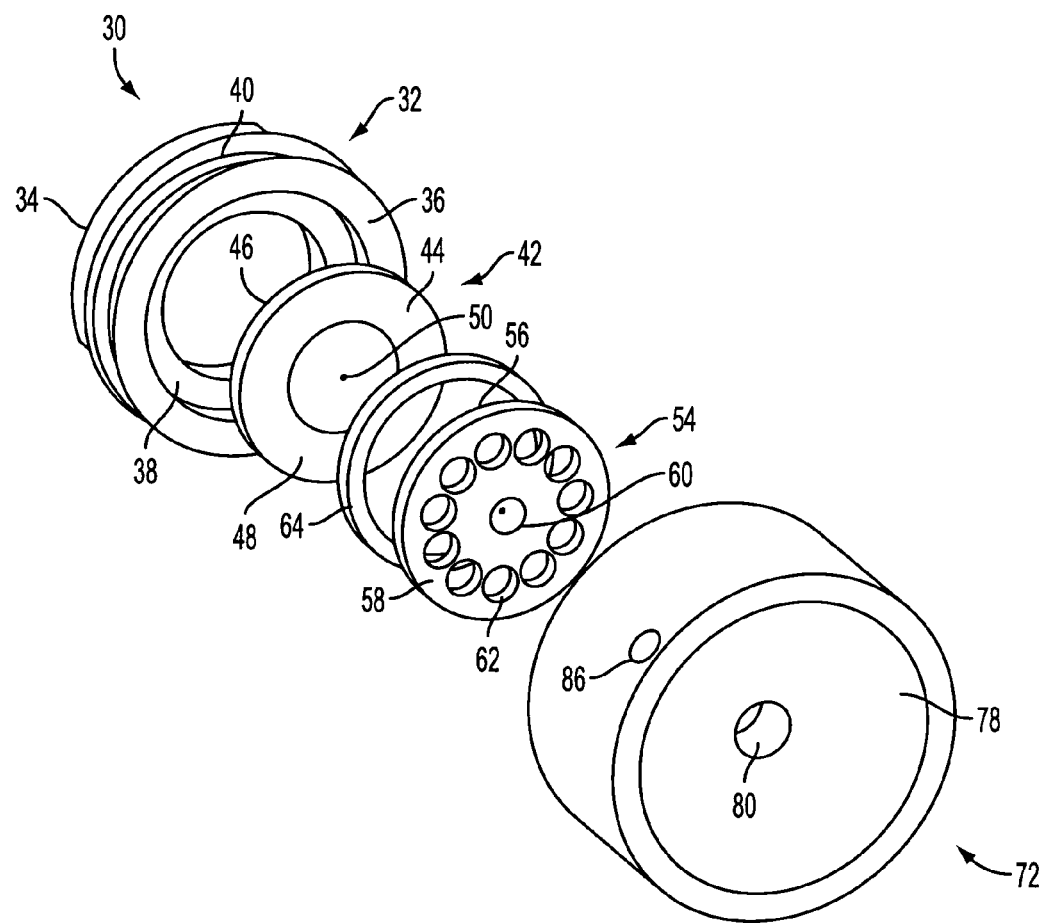
FIG. 2 is an exploded perspective view of an applicator according to the present invention.
Figure 3:
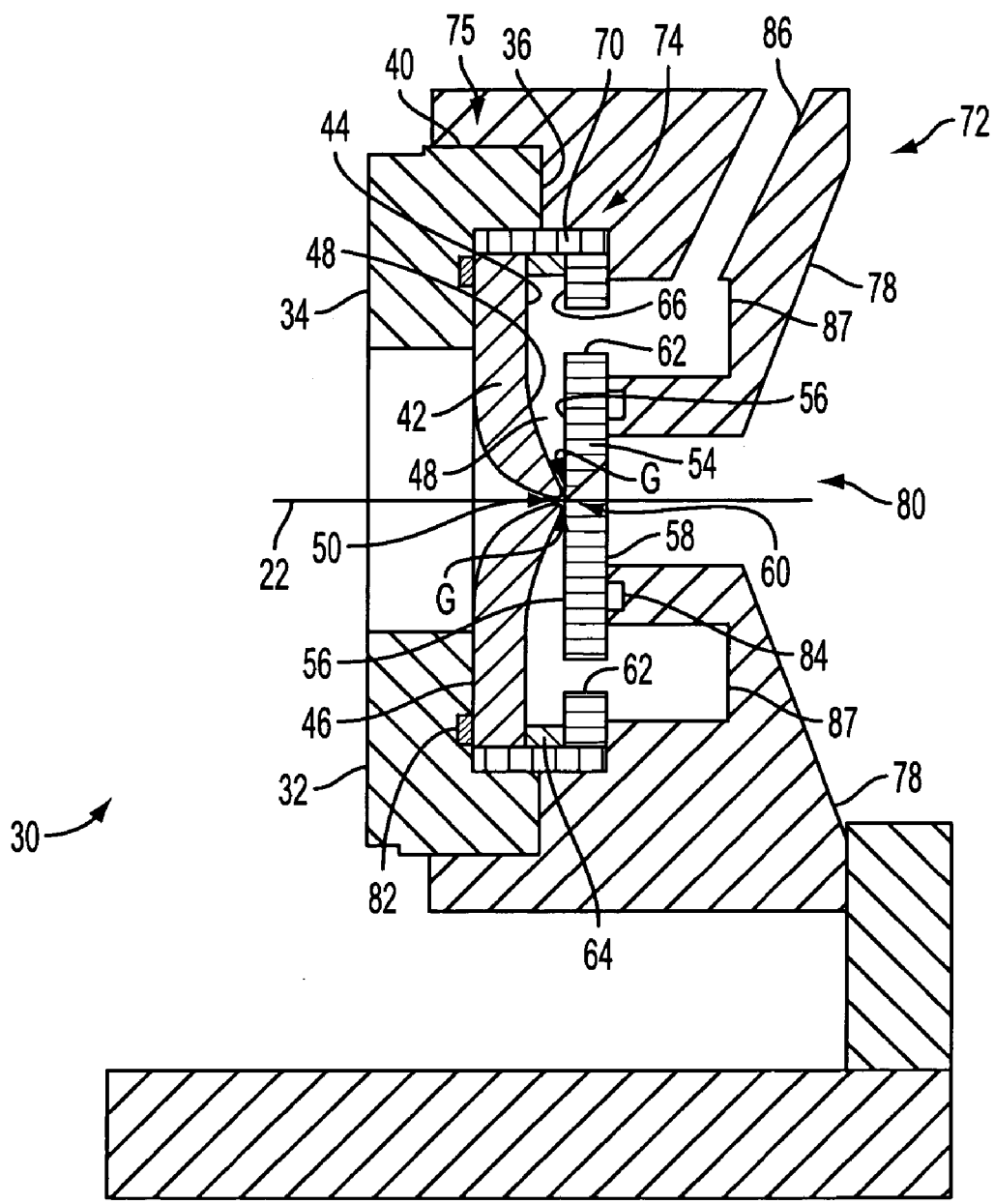
FIG. 3 is a sectional view of an applicator according to the present invention being supported by a base.

FIG. 2 and FIG. 3 illustrate a die assembly 30 for forming the above cable. The die assembly 30 includes a retaining ring 32 which is attached to a main body die 72. Positioned between the retaining ring 32 and the main body die 72, is an entrance die 42 and an exit die 54. These elements are operative to allow for optical fibers to pass through a center thereof.

In further detail, the retaining ring 32 has an entrance side 34 and a containing side 36, which are in communication with each other. The containing side 36 has a recessed area for accommodating the entrance die 42. The retaining ring 32 also has an outer portion 40, which is threaded.

The entrance die 42 has an inner side 44, and an outer side 46. The entrance die 42 may be made from a material, such as tungsten carbide. The inner side 44 has a conical center portion 48 and is dimensioned so as to allow the entrance die 42 to be disposed within the recessed area 38 of the retaining ring 32 so that the outer side 46 of the entrance die 42 is in contact with a wall portion of the recessed area 38. An orifice 50 is provided in the entrance die 42 and is centrally positioned in relation to the conical center portion 48. The outer side 46 of the entrance die 42 has an inwardly tapered section which is angled towards the orifice 50.

In further accordance with the present invention, the exit die 54 is provided with an inner side 56 and an outer side 58. The exit die 54 may be made from a material, such as carbon steel. The exit die 54 also has a centrally positioned orifice 60, which is concentrically positioned with respect to the orifice 50 of the entrance die 42. The exit die 54 further contains a plurality of baffles or baffle holes 62, which are disposed around the orifice 60.

A cylindrically shaped spacer ring 64 is positioned between the entrance die 42 and the exit die 54. The spacer ring 64 is operative to position the entrance die 42 and the exit die 54 at predetermined relationship with respect to each other. The spacer ring 64 is dimensioned to contact wall portions of the entrance and exit dies 42 and 54, so as not to interfere with the plurality of baffles 62 and orifice 60 of the exit die 54, and orifice 50 of the entrance die 42.

Figure 4:
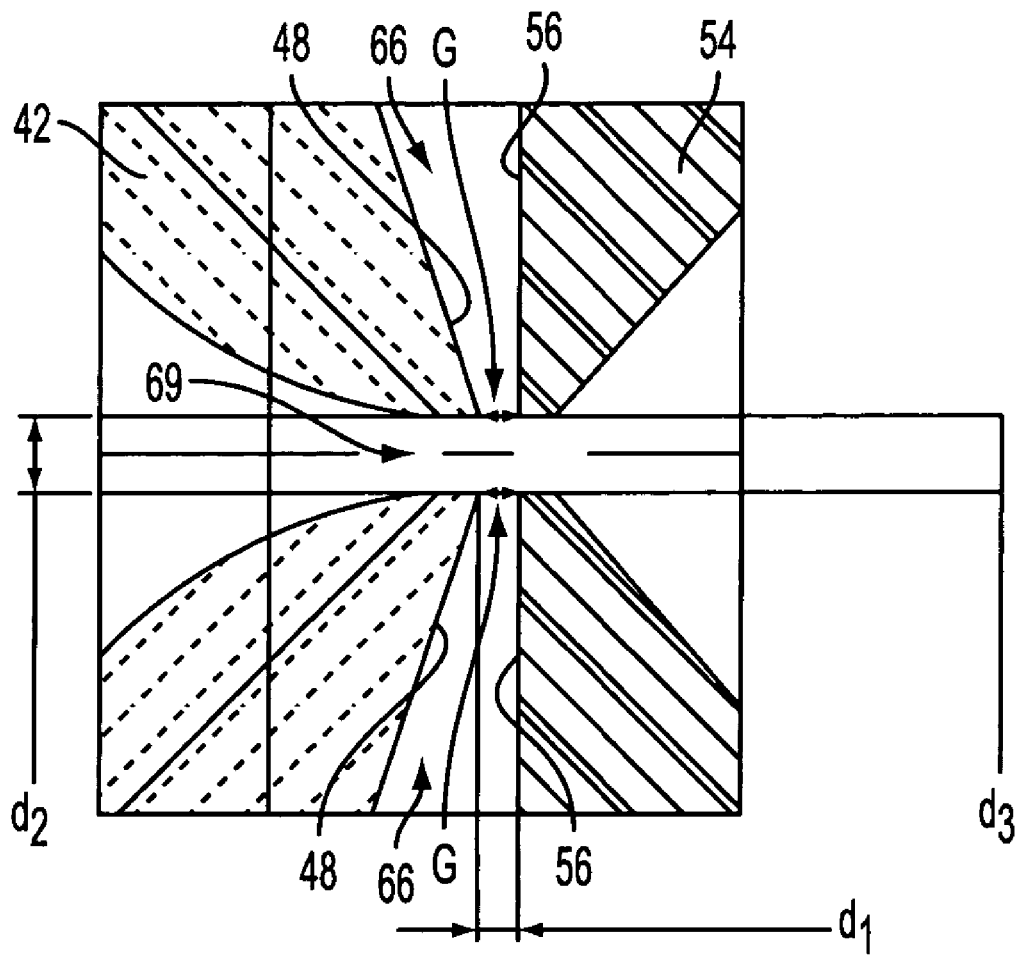
FIG. 4 is an enlarged sectional view of a critical flow region of the applicator.

The contiguous positioning of the entrance and exit dies 42 and 54 form a fluid cavity 66, as shown in FIGS. 3 and 4. The fluid cavity 66 is defined by the conical center portion 48 of the entrance die 42 and the inner side 56 of the exit die 54. The fluid cavity 66 extends circumferentially around, and is in communication with, the orifice 50 of the entrance die 42 and the orifice 60 of the exit die 54, thus producing an exit gap G, having a dimension $d_1$.

With further reference to FIG. 4, the exit gap G forms an integral part of a critical flow region 69. The critical flow region 69 is further defined by dimensions $d_2$ and $d_3$, which respectively represent the orifice diameters of the entrance die 42 and the exit die 54. To prevent sporadic application of a barrier coating to the fibers passing through the invention, the barrier fluid must not be materially disturbed by air that is naturally accelerated toward the die by the approaching fibers. The present invention sizes the critical flow region such that the kinetic energy of the barrier fluid that passes through the exit gap G and contacts the fibers is large in comparison to the air accelerated toward the die entrance by the moving fibers. The upper limit for the dimensions of the critical flow region is chosen such that the kinetic energy of the barrier fluid is larger, for example on the order of several hundred times that, of the potentially entrained air. The lower limit for the dimensions of the critical flow region is constrained by the need to apply the barrier fluid at pressures readily supplied by inexpensive process fluid handling equipment. Also taken into consideration when determining the dimensions of the critical flow region is the desired fiber bundle geometry, as required by the cable product. An exemplary embodiment of gap dimensions which have been shown to produce favorable results include an entrance die diameter $d_2$ and an exit die diameter $d_3$ of 1.04 mm, and a gap G width $d_1$ of 0.5 mm. During testing, such dimensions have resulted in a kinetic power of an extrudate of 4.94 Watts. It was also found that a boundary layer of air around a bundle of 12 fibers traveling at a rate of 1000 m/min produced 0.01 Watts of power. Thus, the kinetic power of the extrudate is much larger than the boundary layer of air around the bundle, which results in a proper application of gel to the bundle without the presence of detrimental air pockets. These dimensions are given by way of example and may change depending on the size of the bundle to be coated.

A slip ring 70 is provided around an outer circumferential surface of both the entrance 42 and exit 54 die. The slip ring 70 forms a slip fit with the dies and is operative to aid in keeping the dies properly aligned.

The main die body 72 has a first recessed portion 74, for receiving the exit die 54, the spacer ring 64 and the entrance die 42. The recessed portion 74 has a first diameter which is dimensioned to form a proper fit with the slip ring 70. The main die body 72 also has a second recessed portion 75 with threads formed thereon, for engaging with the outer threaded portion 40 of the retaining ring 32. Accordingly, when the retaining ring 32 is threadedly engaged with the main die body 72, the entrance die 42, the spacer ring 64, the exit die 54 and the slip ring 70 are secured together to form the die assembly 30.

The main die body 72 also has a conical side 78 which is angled in towards a center portion of the die main body 72. It is also noted that the conical design is given by way of example, and that this side may be formed to be flat in shape. An orifice 80 is provided in the main die body 72 which is centrally positioned with respect to the conical side 78, so as to be in communication with the orifice 60 of the exit die 54 and the orifice 50 of the entrance die 42. In one embodiment of the present invention, an o-ring 82, as shown in FIG. 3, is provided between the retaining ring 32 and the entrance die 42. Additionally, an o-ring 84 is provided between the exit die 54 and the die main body 72. The o-rings may be made from a material, such as nitrile rubber.

An injection port 86 is provided on an outer portion of the main body 72. A cavity 87, which may be annular, is formed to be in communication with the injection port 86, and abuts baffle holes 62. It will also be appreciated that the injection port 86 may be placed in the conical side 78 of the main body 72. The injection port 86 is formed to be in communication with the baffles 62 of the exit die 54. The injection port 86 is also connected to a pumping system, which is operative to supply the gel in a pressurized state and is capable of providing a sufficient quantity of fluid at uniform rates to produce the desired amount to be combined with the group of optical fibers, which is passed therethrough.

With further reference to FIG. 3, during an implementation of the applicator for high-speed gel buffering of optical fiber bundles according to the present invention, the bundle of optical fibers 22 are fed into the die assembly 30 through the entrance side 34 of the retaining ring 32 and into the entrance die 42. The bundle of fibers 22 is then drawn through to the exit die 54, while passing the critical flow region 69. The bundle 22 is then drawn through the outer side 58 of the exit die 54, and out of the die assembly 30. It is noted that the present invention can also be implemented to coat an individual optical fiber, as well as the described optical fiber bundle 22.

The coating of the optical fiber bundle 22 is accomplished by pressurizing gel into the injection port 86 of the main body 72 and through the cavity 87. The pressurized gel then travels into the fluid cavity 66, which is formed between the entrance and exit dies 42 and 54. The shape of the fluid cavity 66 is chosen to have a section wide enough such that resistance to filling of the cavity is small, and varies smoothly, such that flow-induced shear stress on the gel is gradually increased toward the exit gap G.

With additional reference to FIG. 4, the pressurized gel is ejected into the critical flow 69 region via the exit gap G and onto the bundle of fibers 22. The orifice 50 of the entrance die 42 has a dimension $d_2$ so as to slightly compress the original diameter of the bundle of fibers 22. As discussed above, an exemplary size of $d_2$ is 1.04 mm and is chosen to compact the individual optical fibers 10 of the bundle 22, towards each other such that excess air is removed from the bundle 22 and the fiber group attains the degree of compaction required by the cable manufacturing process. With additional reference to FIG. 1, upon the pressurizing of the gel 28 onto the bundle 22, the gel 28 not only coats the outer portion of the bundle 24, but is also forced into the inner portion 26 of the bundle 22.

According to the present invention, the gel 28 is applied by controlling the volumetric flow rate and pressure. For example, for a flow rate of about 57,000 mm$^3$ per minute of gel, cavity pressure of 48,000 Pascal was measured while applying gel on a bundle of 12 fibers. The gel 28 is applied at a high flow rate or velocity in a direction normal to the surface of the optical fibers as the fibers pass between the entrance die 42 and an exit die 54. For example, a mean gel velocity, normal to the fiber bundle in the gap, of 13,000 mm per minute may be used. This creates a linear velocity great enough to overcome the kinetic energy of an air boundary layer traveling along with the fibers toward the die entrance. This is because the kinetic power of the extruded gel is much larger than the boundary layer of air around the bundle of fibers 22. Thus, the method and apparatus is capable of accurately and efficiently combing fluids with optical fibers while eliminating unwanted air pockets.

It will be appreciated by one skilled in the art that the proper application of the gel, according to the present invention, is dependent upon the proper dimensioning of the elements of the die assembly 30. For example, such critical dimensions include the respective diameters $d_2$ and $d_3$ and concentricity of the orifices 50 and 60, of the entrance die 42 and the exit die 54, and the width $d_1$ of the exit gap G, as discussed above.

Although the invention describes the use of a plurality of baffles in the exit die, and an injection port in the main die body, it will be appreciated that a plurality of injection ports may be used, and that the size and shape of the baffles and the injection port may be altered depending on the type of gel used, the shape of the cavity and the rate at which the fibers are drawn through the die assembly.

Although the invention describes the use of a conical region formed on the entrance die for creating a particular shaped cavity, it will be appreciated that various configurations of the inner side of the entrance die, and the inner side of the exit die may be used to obtain various shaped cavities depending on the desired flow behavior of the gel.

It is, of course, understood that departures can be made from the preferred embodiments of the invention by those of ordinary skill in the art without departing from the spirit and scope of the invention that is limited only by the following claims.

What is claimed is:

1. An apparatus for combining a fluid with an optical fiber, comprising:
   a die having an entrance portion and exit portion each having an orifice for passing an optical fiber therethrough;
   a fluid cavity between said entrance portion and said exit portion; and
   a plurality of holes which extends through said exit portion and are positioned radially around the orifice of said exit portion, said holes being in fluid communication with said cavity, and
   wherein one of an inner side of said entrance portion and an inner side of said exit portion has a gradually varying portion which provides said cavity with a tapered shape, wherein said plurality of holes extends in an axial direction of the orifice of said exit portion.

2. The apparatus for combining a fluid with an optical fiber of claim 1, wherein the die further has a fluid insertion port for injecting fluid into said cavity.

3. The apparatus for combining a fluid with an optical fiber of claim 1, wherein said orifices are dimensioned to permit the passage of a plurality of optical fibers which form a bundle.

4. The apparatus for combining a fluid with an optical fiber of claim 3, wherein said fluid is propelled at a velocity which causes it to reach and be deposited on an inner portion of said bundle.

5. The apparatus for combining a fluid with an optical fiber of claim 3, wherein said entrance portion arid said exit portion are respectively formed from a separate entrance die and an exit die, which are brought together to form said cavity, and wherein said entrance die and said exit die respectively contain said orifices for drawing therethrough said optical fiber.

6. The apparatus for combining a fluid with an optical fiber of claim 5, wherein said entrance die and said exit die are separated by a spacer ring.

7. The apparatus for combining a fluid with an optical fiber of claim 5, wherein said orifice of said entrance die is dimensioned to accept a plurality of fibers which are formed in a circular pattern such that when they are passed through said orifice of said entrance die they are radially compressed.

8. The apparatus for combining a fluid with an optical fiber of claim 5, wherein said entrance die, in the vicinity of said orifice of said entrance die, is angled inwardly.

9. The apparatus for combining a fluid with an optical fiber of claim 8, wherein said exit die, in the vicinity of said orifice of said exit die, is angled inwardly.

10. The apparatus for combining a fluid with an optical fiber of claim 5, wherein the entrance die and exit die are spaced apart to form an exit gap, such that fluid can flow from the cavity and through the exit gap to contact the optical fiber.

11. The apparatus for combining a fluid with an optical fiber of claim 10, wherein a linear velocity of the fluid is sufficient to overcome kinetic energy of an air boundary layer traveling along with the optical fiber which is drawn through said entrance die prior to the coated fiber being drawn through said exit die.

12. The apparatus for combining a fluid with an optical fiber of claim 1, wherein said fluid is a gel comprising one of a Newtonian liquid, dilute solution containing polymer molecules, and a liquid slurry containing solid particles.

13. The apparatus for combining a fluid with an optical fiber of claim 1, further including a main body which supports said entrance portion and said exit portion, wherein said main body includes a passageway which is in fluid communication with said plurality of holes of said exit portion, and wherein a fluid flow path is defined through said passageway to an exit gap.

14. The apparatus for combining a fluid with an optical fiber of claim 13, wherein said main body has an exit side with a conical shaped recess portion.

15. The apparatus for combining a fluid with an optical fiber of claim 13, further including a retaining ring which secures said entrance portion and said exit portion to said main body.

16. The apparatus for combining a fluid with an optical fiber of claim 15, wherein said retaining ring is threadedly engaged with said main body.

17. The apparatus for combining a fluid with an optical fiber of claim 16, wherein a slip ring is positioned on an outer circumference of said entrance portion and said exit portion.

18. The apparatus for combining a fluid with an optical fiber of claim 1, wherein said orifices have a diameter which is dimensioned to make contact with an optical fiber when said optical fiber is drawn through said orifices.

19. An apparatus for combining a fluid with an optical fiber, comprising:
   a die having an entrance portion and exit portion each having an orifice formed therethrough, said orifices being in communication with an exit gap which extends around a portion of said orifices, wherein fluid is passed though said exit gap and onto an optical fiber,
   wherein said entrance portion and said exit portion have inside areas which form a cavity, and
   wherein said exit portion has a plurality of through holes which are in fluid communication with said cavity, the holes extend through said exit portion in an axial direction of said orifice of said exit portion.

20. The apparatus for combining a fluid with an optical fiber of claim 19, wherein said entrance portion and said exit portion are respectively formed from an entrance die and an exit die.

21. An apparatus for combining a fluid with an optical fiber, comprising:
   a die having an entrance portion and exit portion each having an orifice for passing an optical fiber therethrough;
   a fluid cavity between said entrance portion and said exit portion;
   a plurality of holes which extends through said exit portion and are positioned radially around the orifice of said exit portion, said holes being in fluid communication with said cavity, and said plurality of holes extending in an axial direction of the orifice of said exit portion;

a main body which supports said entrance portion and said exit portion, said main body including a passageway which is in fluid communication with said plurality of holes of said exit portion, such that a fluid flow path is defined through said passageway to an exit gap; and a retaining ring which secures said entrance portion and said exit portion to said main body, wherein said retaining ring is threadedly engaged with said main body.

22. The apparatus for combining a fluid with an optical fiber of claim 21, wherein a slip ring is positioned on an outer circumference of said entrance portion and said exit portion.

23. The apparatus for combining a fluid with an optical fiber of claim 21, wherein said entrance portion and said exit portion are respectively formed from an entrance die and an exit die.

* * * * *